United States Patent [19]

Miyakoshi et al.

[11] Patent Number: 4,497,506
[45] Date of Patent: Feb. 5, 1985

[54] ANTI-LIFTING MECHANISM FOR MOTOR VEHICLES

[75] Inventors: Shinichi Miyakoshi, Saitama; Tokio Isono, Tokyo, both of Japan

[73] Assignee: Honda Giken Kogyo Kabushiki Kaisha, Tokyo, Japan

[21] Appl. No.: 461,135

[22] Filed: Jan. 26, 1983

[30] Foreign Application Priority Data

Jan. 26, 1982 [JP] Japan ................. 57-9856[U]

[51] Int. Cl.³ ............................................ B62K 25/04
[52] U.S. Cl. ................................................ 280/703
[58] Field of Search ............... 280/703, 276, 279, 690, 280/701, 288, 757, 721, 284

[56] References Cited

U.S. PATENT DOCUMENTS

| | | | |
|---|---|---|---|
| 2,954,237 | 9/1960 | Sampietro | 280/703 |
| 3,917,313 | 11/1975 | Smith et al. | 280/288 |
| 4,159,123 | 6/1979 | Petty | 280/703 |
| 4,322,088 | 3/1972 | Miyakoshi et al. | 280/284 |
| 4,429,760 | 2/1984 | Koizumi et al. | 280/284 |

OTHER PUBLICATIONS

Japanese Utility Model Laid Open Publication No. 31990/1981.

*Primary Examiner*—Richard A. Bertsch
*Attorney, Agent, or Firm*—Irving M. Weiner; Pamela S. Burt

[57] ABSTRACT

An anti-lifting mechanism which utilizes a braking torque during braking of a rear wheel of a motor vehicle to prevent the vehicular body frame from being lifted up at the rear portion thereof. The anti-lifting mechanism includes a torque link arrangement for transmitting the braking torque to the vehicular body, the torque link arrangement comprising a substantially straight first torque transfer member, a substantially straight second torque transfer member and a link member interposed between the first and the second torque transfer members to interconnect the torque transfer members. Because the torque link arrangement can be constituted as a bent path, its constituent members can be disposed a selective arrangement, and the unsprung load of a shock absorber is reduced.

30 Claims, 18 Drawing Figures

ANTI-LIFTING MECHANISM FOR MOTOR VEHICLES

BACKGROUND OF THE INVENTION

1. Field of the Invention

The present invention relates to an anti-lifting mechanism for preventing a motor vehicle from being lifted up at the rear portion of the body frame thereof when the brake is applied.

2. Description of the Prior Art

When the brake is applied for decelerating or stopping a motor vehicle, for example, a two-wheeled motor vehicle, the front portion of the vehicular body frame comes down, the rear portion thereof is lifted up and the rear wheel tends to float from the road surface, due to a frictional force between the road surface and the wheels and a moment about the vehicular center of gravity induced by a forward shift thereof because of the force of inertia. A known device for preventing such a tail lifting phenomenon, is disclosed in Japanese Utility Model Laid Open Publication No. 31990/1981 which utilizes a braking force of the rear wheel, as illustrated in FIG. 17 of the accompanying drawings.

In FIG. 17, a rear fork 501 supports a rear wheel 503 at its rear end and hence serves as a rear wheel supporting member, and its front end is vertically pivotably connected to a body frame 500 through a pivot shaft 502. Rotatably supported by the rear fork 501 is a brake disc 504 serving as a brake member coaxial and integral with the rear wheel 503. Furthermore, a bracket 506 which holds a brake caliper 505 is pivotally attached to the rear fork 501 about an axle 503a of the rear wheel 503. A brake caliper 505, together with the bracket 506, constitutes a braking means; that is, a hydraulically operated brake pad is brought into pressure contact with the brake disc 504 to brake the rear wheel 503 to thereby decelerate or stop the motor vehicle. The body frame 500 and the bracket 506 are interconnected through a link means 508 which comprises a single torque rod 507. When the rear wheel 503 is braked by the brake caliper 505, the bracket 506 pivots in a counterclockwise direction in FIG. 17 about the axle 503a, whereby a rearward tensile force is exerted on the torque rod 507, and by virtue of this tensile force the front and the rear portion of the body frame 500 are prevented from coming down and being lifted up, respectively. At this instant, a reaction of the tensile force of the torque rod 507 against the body frame 500, which is a relatively stationary member, acts on the relatively pivotable rear fork 501 through the pivot shaft 502 as a counterclockwise moment M in FIG. 17. Accordingly it is necessary to produce the counterclockwise moment M on the rear fork in order to attain an anti-lifting effect.

In the prior art arrangement described above, because the torque link means 508 is constituted by a single torque rod 507 for producing the moment M on the rear fork 501, it is necessary that the torque rod 507 cross the rear fork 501 when viewed from the side and that, as shown in FIG. 17, a connecting position A between the body frame 500 and the torque rod 507 and a connecting position B between the bracket 506 and the torque rod 507 be made opposite to each other in the vertical direction with respect to the rear fork 501. In such a construction, it would be impossible to pass the straight torque rod 507 through a clearance S formed between the rear fork 501 and the rear wheel 503 because the clearance S is very small, as shown in FIG. 18, and for this reason it is inevitably necessary to use a bent torque rod 507′, 507″ or 507‴ as shown in FIGS. 17 and 18 to avoid interference with the rear fork 501 and the rear wheel 503. In this case, however, the torque rod becomes insufficient in strength against the load exerted thereon, thus causing a problem in torque transmission between the body frame 500 and the bracket 506 and further causing a likelihood of deformation of the torque rod.

The present invention has been attained in order to effectively overcome the above-mentioned problems of the conventional anti-lifting mechanism.

SUMMARY OF THE INVENTION

According to the present invention there is provided an anti-lifting mechanism in a motor vehicle having at least one shock absorber, a rear wheel supporting member vertically pivotably connected at the front end thereof to a body frame, a brake member integral with a rear wheel and rotatably supported by the rear wheel supporting member, braking means for braking at least one rear wheel by pressure contact thereof with the brake member, braking force sensing means fixed to the braking means and rotatably supported by a rear axle which supports the rear wheel, and torque link means disposed between the braking force sensing means and the body frame for transmitting a braking torque of the rear wheel to the vehicular body. The aforesaid torque link mechanism comprises a substantially straight first torque transfer member, a substantially straight second torque transfer member and a link member interposed between the first and second torque transfer members for interconnection of the two, the link member being pivotally connected to either the body frame or the rear wheel supporting member.

It is therefore an object of the present invention to provide an anti-lifting mechanism for motor vehicles wherein the torque transfer path can be bent at the portion of the link member to avoid interference with the rear wheel supporting member and the rear wheel, and nevertheless the first and the second torque transfer members can each be formed of a short and straight member, which is highly advantageous with respect to strength.

It is another object of the present invention to provide an anti-lifting mechanism for motor vehicles wherein in some particular positional relation of connection between the first and the second torque transfer member the torque transfer path is not always required to cross the rear wheel supporting member when viewed from the side and therefore the constituent members of the torque transfer path can be disposed in a selective arrangement, that is, the degree of freedom of arrangement of the torque transfer members is large and assembly and construction thereof is facilitated.

It is a further object of the present invention to provide an anti-lifting mechanism for motor vehicles wherein the aforesaid constituent members can be mounted effectively by utilization of a space which is provided around the rear wheel supporting member.

It is a still further object of the present invention to provide an anti-lifting mechanism for motor vehicles capable of reducing the unsprung load of a shock absorber thereby contributing to the improvement of driving comfort.

Preferred embodiments of the present invention will be described in detail hereinafter with reference to the accompanying drawings, from which further features, objects and advantages of the invention will become apparent.

DETAILED DESCRIPTION OF PREFERRED EMBODIMENTS

Figure 1:
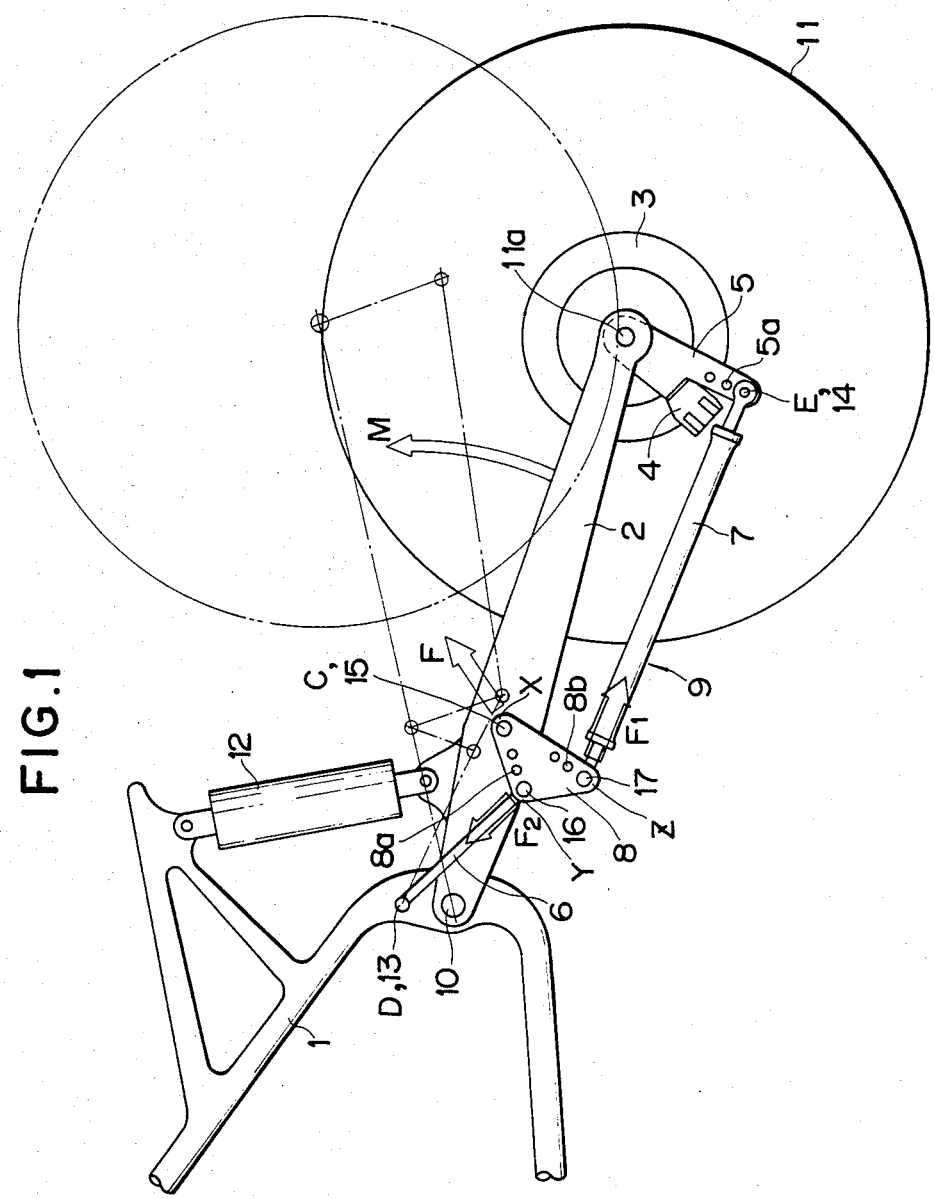
FIG. 1 is a side view of an anti-lifting mechanism according to a first embodiment of the present invention.
Figure 2:
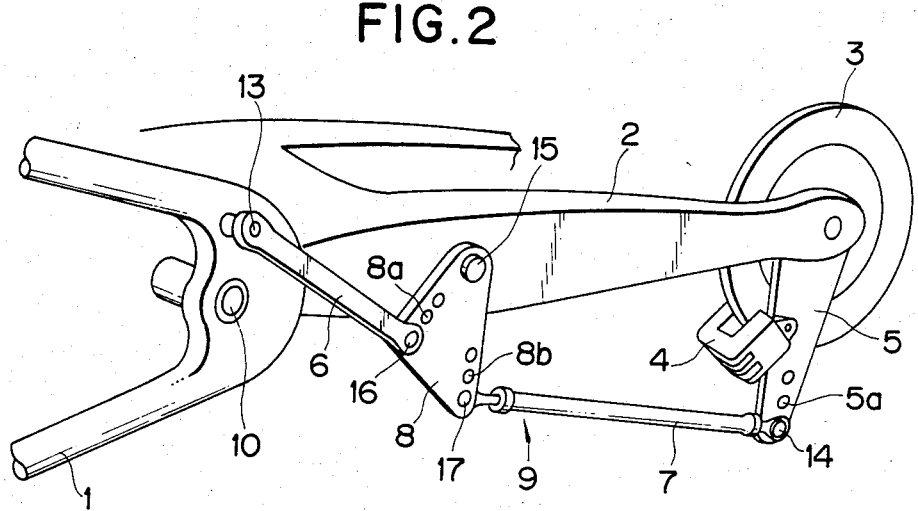
FIG. 2 is a perspective view of the anti-lifting mechanism shown in FIG. 1.
Figure 3:
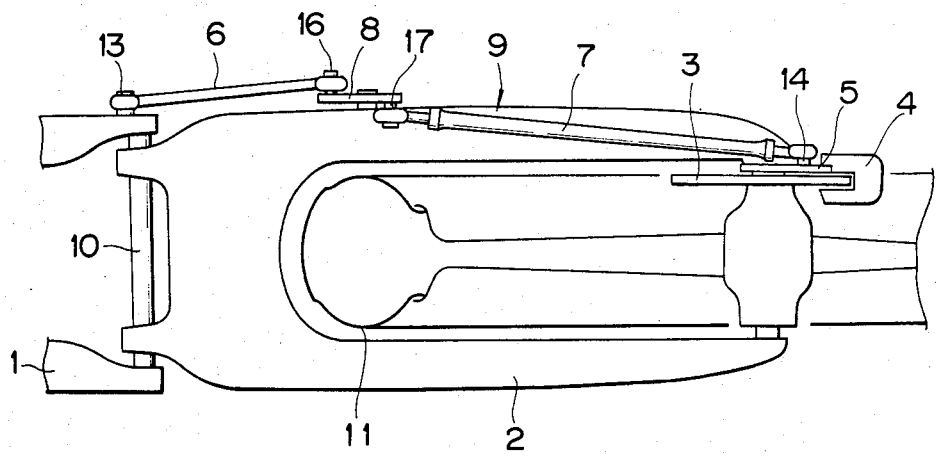
FIG. 3 is a bottom view of the anti-lifting mechanism shown in FIG. 1.
Figure 17:
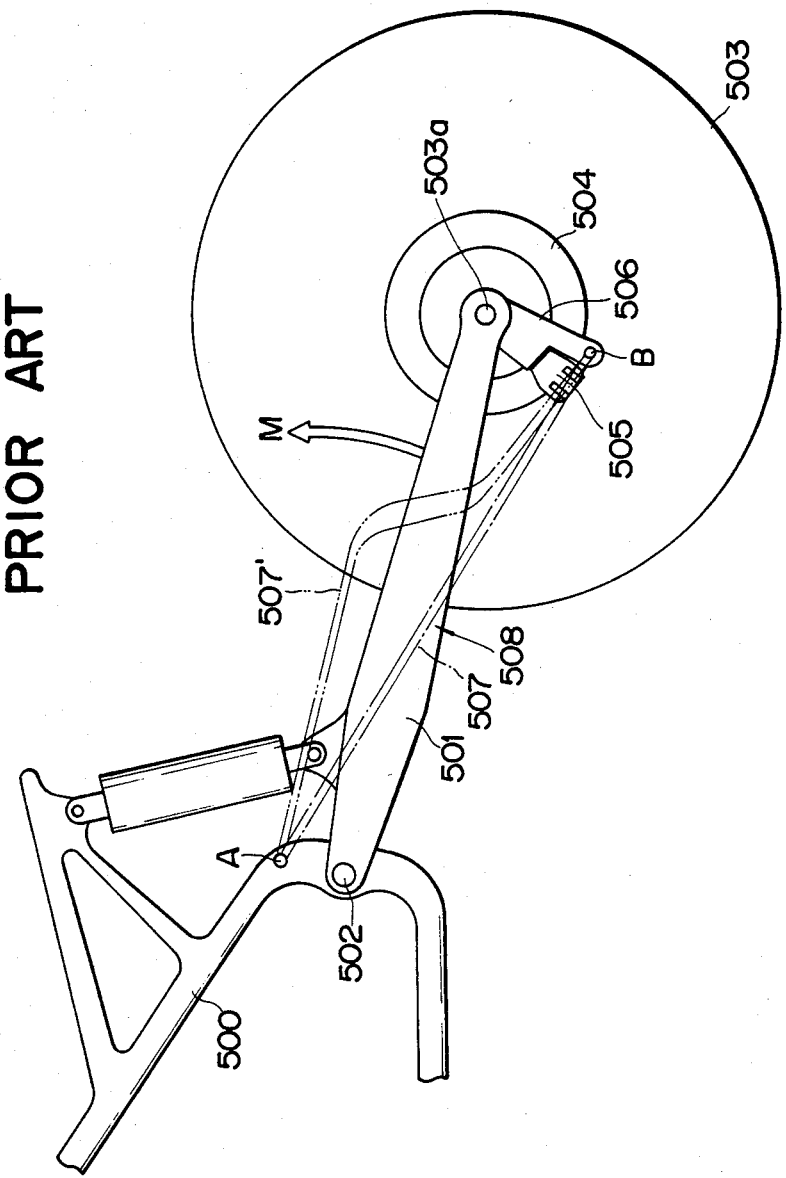
FIGS. 17 and 18 are side and plan views, respectively, of a conventional anti-lifting mechanism.
Figure 18:
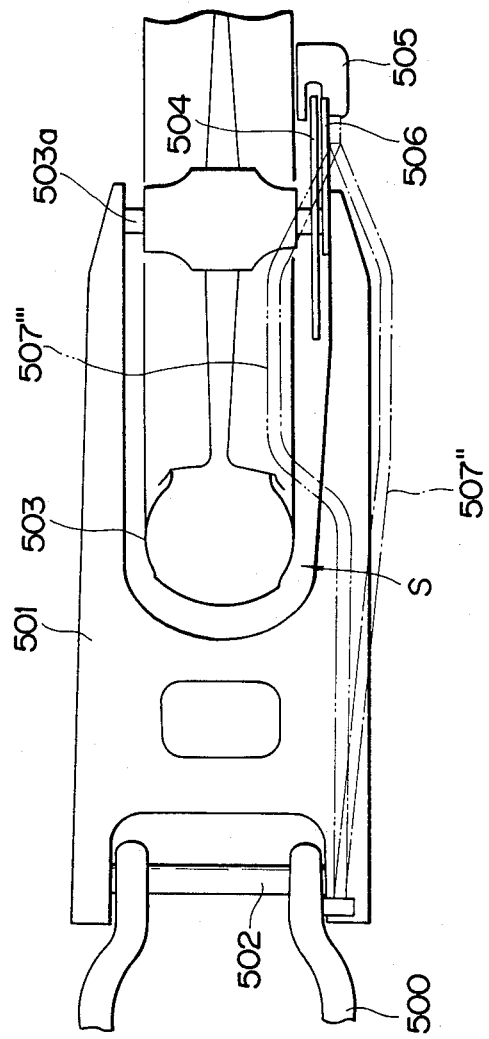

Referring first to FIGS. 1 through 3, there is shown an anti-lifting mechanism according to a first embodiment of the present invention, in which the construction and mounting structure of body frame 1, rear wheel supporting member 2 and braking unit 4 are the same as in the prior art already referred to in connection with FIG. 17.

The rear wheel supporting member or rear fork 2 is vertically pivotably connected at its front end to the body frame 1 through a pivot shaft 10, and a brake disc 3 as a brake member, which is integral with a rear wheel 11, is rotatably supported by the rear end of the rear fork 2. Further, a bracket 5 which holds the braking unit or brake caliper 4 is pivotably attached to the rear fork 2 about an axle 11a of the rear wheel 11. The brake caliper 4 and the bracket 5 constitute braking means and braking force sensing means, respectively, which are pivotable with respect to the rear fork 2. The rear wheel 11 is braked by a hydraulic pressure contact of a brake pad of the brake caliper 4 with the brake disc 3, and by virtue of a frictional force between the brake pad and the brake disc the brake caliper 4 and bracket 5 move pivotally in a counterclockwise direction in FIG. 1 which is the rotating direction of the rear wheel 11. Between the body frame 1 and the rear fork 2 is mounted a shock absorber 12 to absorb and cushion vertical movements of the rear wheel 11 caused by swinging motions of the rear fork 2.

Although the braking device described above is a disc brake type comprising the brake disc and the brake caliper, it may alternatively be a drum brake type comprising a brake drum and a brake shoe.

A first torque rod 6 which serves as a first torque transfer member is pivotally connected at its front end to the body frame 1 through a shaft 13 in a position above the pivot shaft 10, while to the bracket 5 is pivotally connected through a shaft 14 the rear end of a second torque rod 7 which serves as a second torque transfer member, the torque rod 7 being a turn-buckle type which is adjustable in length. A plate-like link member 8 having a triangular shape in side elevation is longitudinally pivotably connected at a first end X thereof, which is the upper end, to a side of the rear fork 2 through a shaft 15. The link member 8, which serves as a bell crank, is interposed between the first and second torque rods 6 and 7, and the rear end of the first torque rod 6 and the front end of the second torque rod 7 are pivotally connected to the link member 8 through shafts 16 and 17 at a second end Y and a third end Z of the link member, respectively. Thus, in this embodiment the link member 8 is pivotally connected to the rear fork 2.

The shafts 13, 14, 16 and 17 respectively connecting between the body frame 1 and the first torque rod 6, between the bracket 5 and the second torque rod 7, between the link member 8 and the first torque rod 6 and between the link member 8 and the second torque rod 7, are each a universal joint shaft such as a ball joint as shown in FIG. 3. A torque transfer path 9 as a link mechanism type torque link means comprises the first torque rod 6 on the body frame side, the second torque rod 7 on the braking force sensing means side and the link member 8 which interconnects those torque rods 6 and 7. The torque transfer path 9 is bent at the portion of the link member 8, and the body frame and the braking force sensing means are interconnected through the torque transfer path 9 which is so arranged as to avoid interference with the rear fork 2 and rear wheel 11.

In the hereinbefore described construction, when the rear wheel 11 is braked by the brake caliper 4 during travel of the motor vehicle, the bracket 5 which constitutes the braking force sensing means pivotally moves in a counterclockwise direction in FIG. 1 about the axle 11a as previously noted, so that a rearward tensile force $F_1$ acts on the second torque rod 7. On the other hand, the body frame 1 tends to tilt forwardly downward due to deceleration and stopping of the motor vehicle, so that a forward tensile force $F_2$ acts on the first torque rod 6. A resultant force F of these forces is applied from the link member 8 to the rear fork 2, and causes an upward moment M to be produced which acts to pivot the rear fork 2 in a counterclockwise direction in FIG. 1 about the pivot shaft 10. In this case, if the rear fork 2 and the body frame 1 are assumed to be a stationary system and a movable system, respectively, it follows that a moment in the direction opposite to the moment M acts on the body frame 1, whereby the body frame 1 is prevented from being lifted up at its rear portion around the vehicular center of gravity at the time of braking of the motor vehicle, and an anti-lifting effect is attained.

Although in this embodiment the torque transfer path 9 is bent, the torque rods 6 and 7 on which are respectively exerted the tensile forces $F_2$ and $F_1$ may be straight and short rods, thus permitting the torque rods 6 and 7 to be strengthened to an extremely great extent against the tensile forces $F_2$ and $F_1$, respectively.

In the first embodiment described above, the link member 8 is pivotally connected to the rear fork side, and the bracket 5 and the link member 8 are formed with a plurality of substantially vertically spaced connecting holes 5a..., 8a..., 8b... so that the connecting position between the bracket 5 and the second torque rod 7 and the connecting positions between the link member 8 and the first and second torque rods 6 and 7 can be changed up and down. Therefore, by adjusting the inclination angle of the first and second torque rods 6 and 7 with respect to the horizontal direction, the direction of the foregoing resultant force F is changed to increase or decrease the magnitude of the moment M, thus permitting adjustment of the anti-lifting characteristic.

Furthermore, because the torque transfer path 9 is a bent path formed by a plurality of torque transfer members, the direction of torque transfer can be changed as desired, and therefore the degree of freedom of design becomes very high.

Referring now to FIGS. 4 through 10, there are shown second through eighth embodiments of the present invention which exhibit the same effect as in the first embodiment described above, in which the reference numerals 21, 31, 41, 51, 61, 71 and 81 respectively denote a body frame, the numerals 22, 32, 42, 52, 62, 72 and 82 respectively denote a rear fork serving as a rear wheel supporting member, the numerals 23, 33, 43, 53, 63, 73 and 83 respectively denote a brake disc serving as a brake member, the numerals 24, 34, 44, 54, 64, 74 and 84 respectively denote a brake caliper, and the numerals 25, 35, 45, 55, 65, 75 and 85 respectively denote a bracket which holds the brake caliper, the brake caliper and the bracket constituting braking means and braking force sensing means. The numerals 26, 36, 46, 56, 66, 76 and 86 respectively denote a first torque rod serving as a first torque transfer member pivotally connected at one end thereof to the body frame side in the first through eighth embodiments, the numerals 27, 37, 47, 57, 67, 77 and 87 respectively denote a second torque rod serving as a second torque transfer member pivotally connected at one end thereof to the braking force sensing means, the numerals 28, 38, 48, 58, 68, 78 and 88 respectively denote a link member, and the numerals 29, 39, 49, 59, 69, 79 and 89 respectively denote a torque transfer path.

In the first embodiment shown in FIG. 1, the first and second torque rods 6 and 7 are connected respectively to the second and third ends Y and Z of the link member 8 which are both in lower positions with respect to a pivotal connection C between the rear fork 2 and the link member 8 at the first end X of the link member 8, so that the torque transfer path 9 when viewed from the side crosses the rear fork 2, and a connecting position D between the body frame 1 and the first torque rod 6 and a connecting portion E between the braking force sensing means and the second torque rod 7 are substantially vertically opposite to each other with respect to the rear fork 2, that is, the connecting position D is above and the connecting position E is below. Also, in the third, fifth and sixth embodiments shown in FIGS. 5, 7 and 8, respectively, as in the first embodiment, the first and second torque rods 36, 56, 66 and 37, 57, 67 are connected to the link members 32, 52 and 62 on the same side in the vertical direction with respect to pivotal connections C between the rear forks 32, 52, 62 and the link members 38, 58 and 68, and connecting positions D between the body frames 31, 51, 61 and the first torque rods 36, 56, 66 and connecting positions E between the braking force sensing means and the second torque rods 37, 57, 67 are substantially vertically opposite to each other with respect to the rear forks 32, 52 and 62, respectively. Particularly, in the embodiments of FIGS. 7 and 8, the brackets 55 and 65 are integrally formed with extension portions 55a and 65a each extending upward beyond a rear wheel axle G, whereby the connecting positions E and D are set respectively above and below the rear forks 52 and 62. The brake caliper and the bracket may be disposed above the rear wheel axle as will be described hereinbelow in connection with FIG. 14.

In the second, fourth, seventh and eighth embodiments respectively shown in FIGS. 4, 6, 9 and 10, unlike the first embodiment, the first and second torque rods 26, 46, 76, 86 and 27, 47, 77, 87 are connected to the link members 28, 48, 78 and 88 substantially vertically opposite to each other with respect to pivotal connections C between the rear forks 22, 42, 72, 82 and the link members 28, 48, 78, 88, and connecting positions D between the body frames 21, 41, 71, 81 and the first torque rods 26, 46, 76, 86 and connecting positions E between the braking force sensing means and the second torque rods 27, 47, 77, 87 are vertically on the same side with respect to the rear forks 22, 42, 72 and 82, respectively.

In these embodiments, the link members 28, 48, 78 and 88 are each endowed with a function as a direction changing lever, whereby the connecting positions D and E can be disposed vertically on the same side with respect to the rear forks 22, 42, 72 and 82, and hence it becomes unnecessary to cross the torque transfer paths 29, 49, 79, 89 and the rear forks 22, 42, 72, 82.

Figure 4:
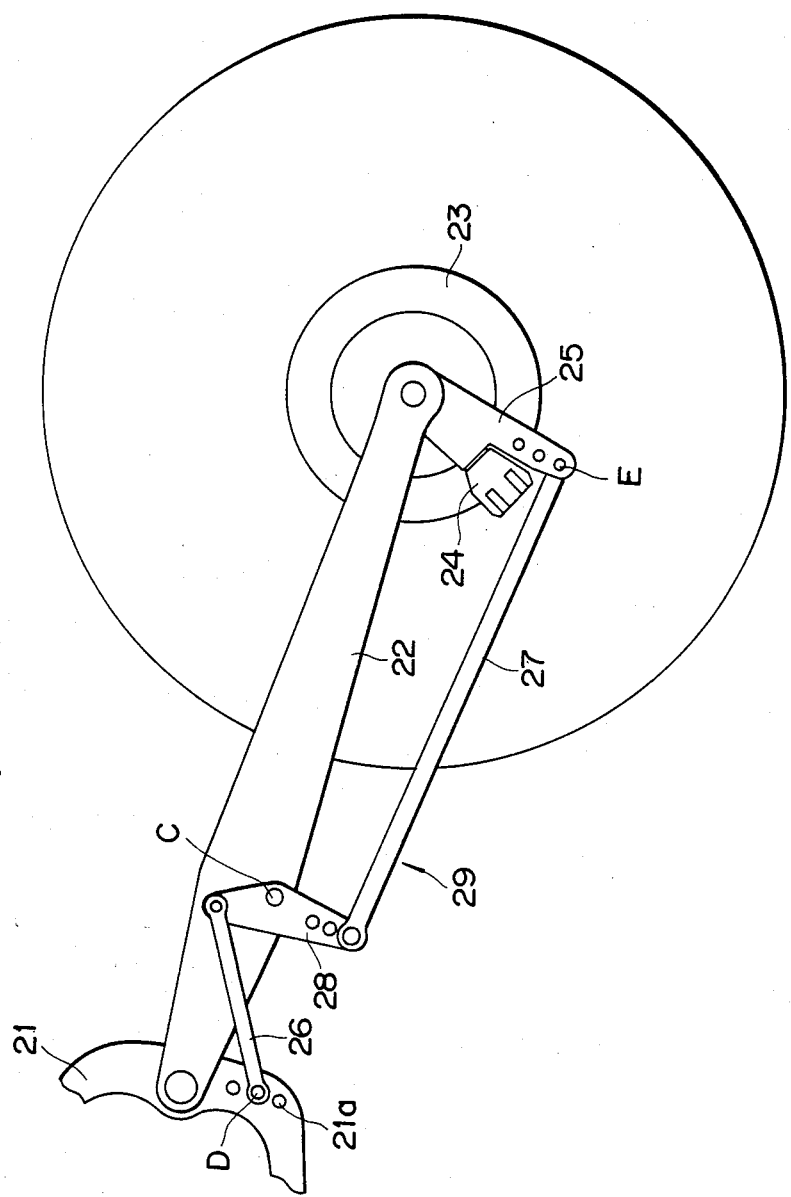
FIGS. 4 through 10 are side views of anti-lifting mechanisms according to second through eighth embodiments of the invention, respectively.
Figure 5:
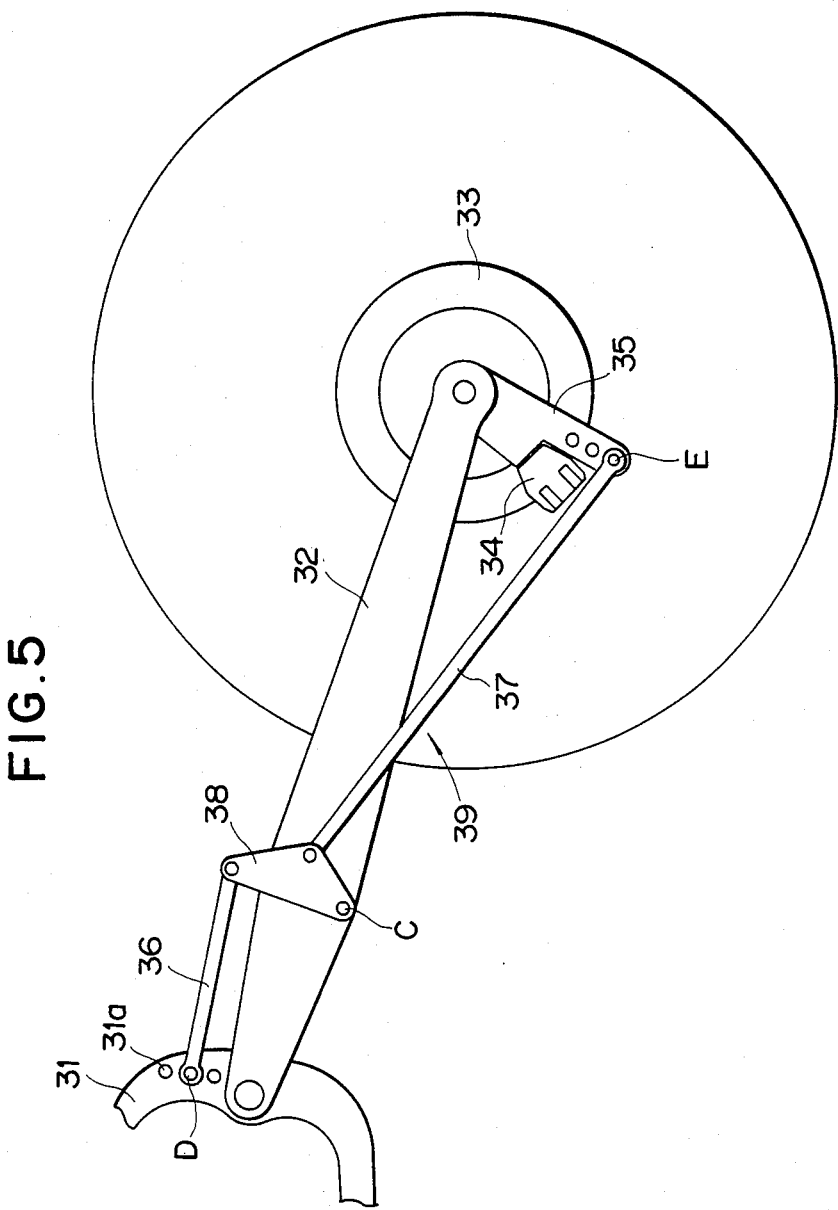
Figure 6:
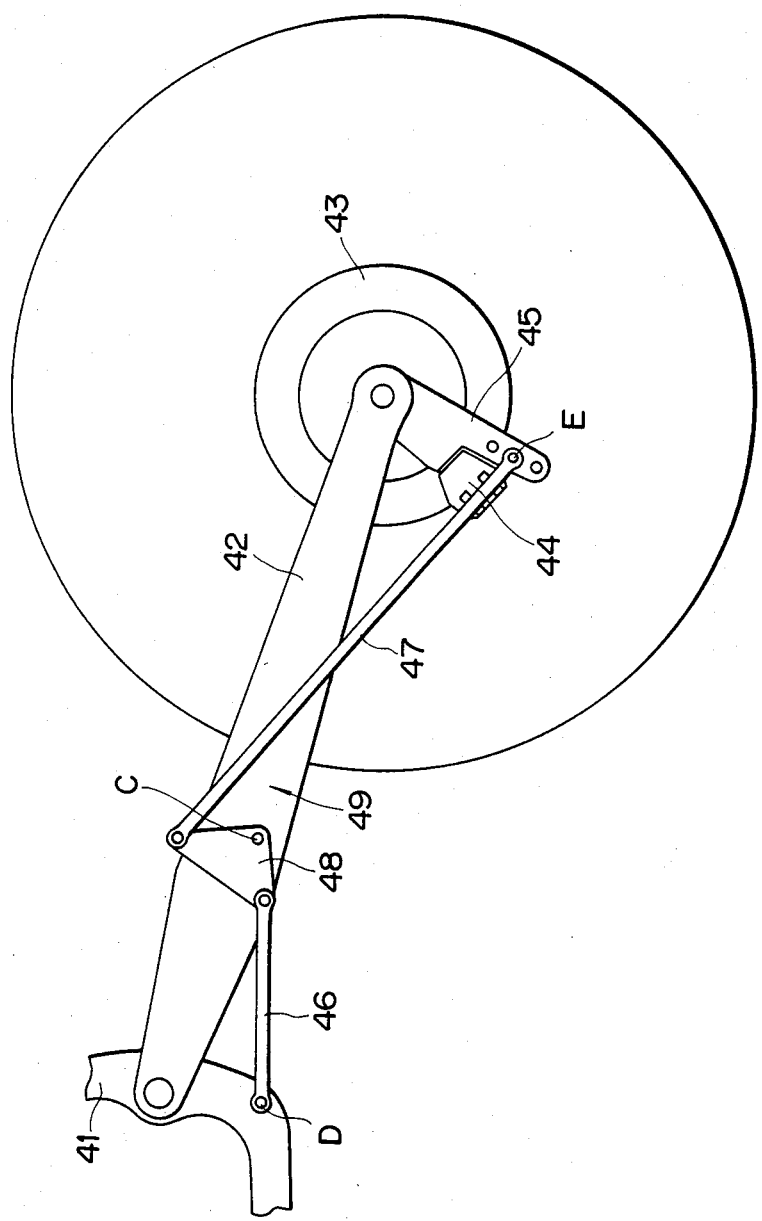
Figure 7:
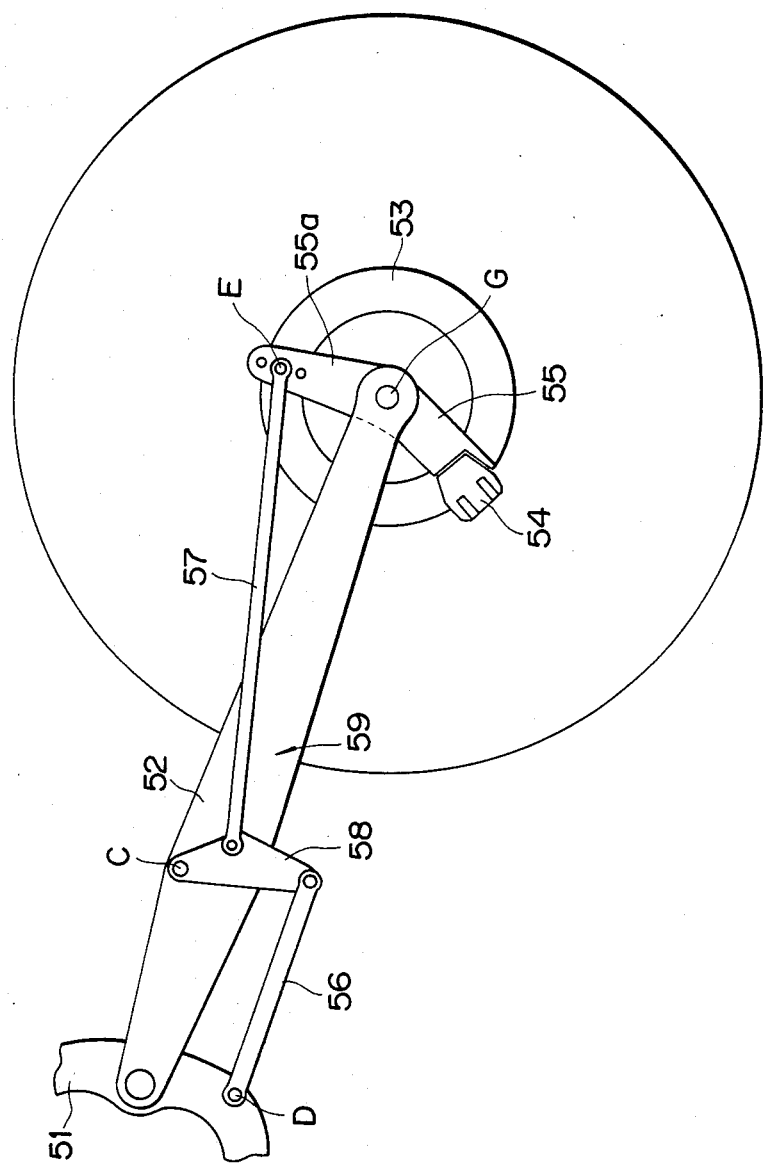
Figure 8:
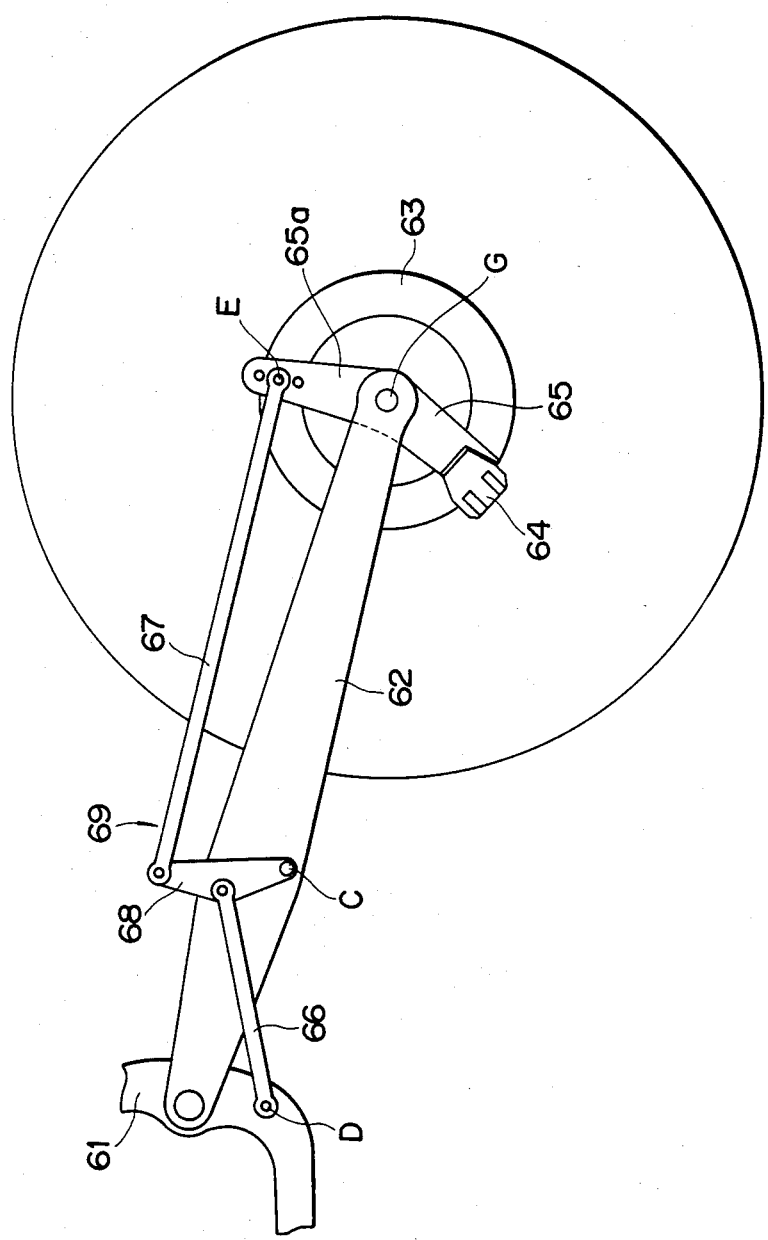
Figure 9:
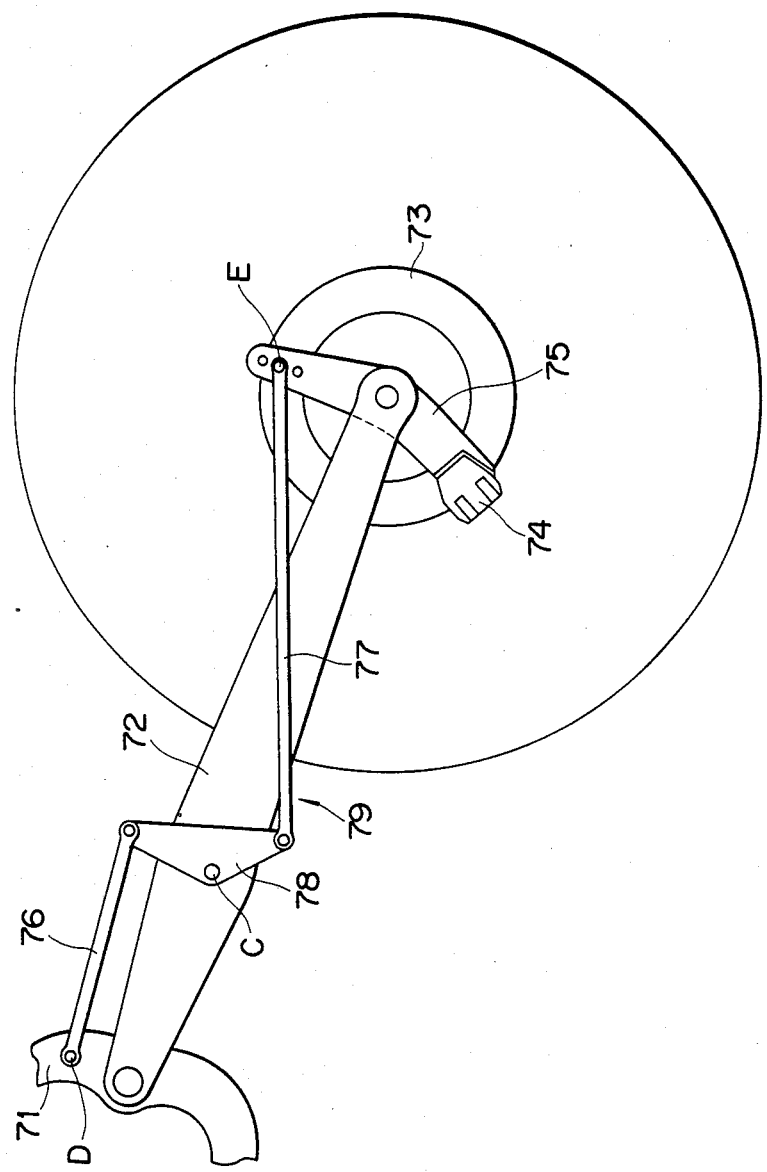
Figure 10:
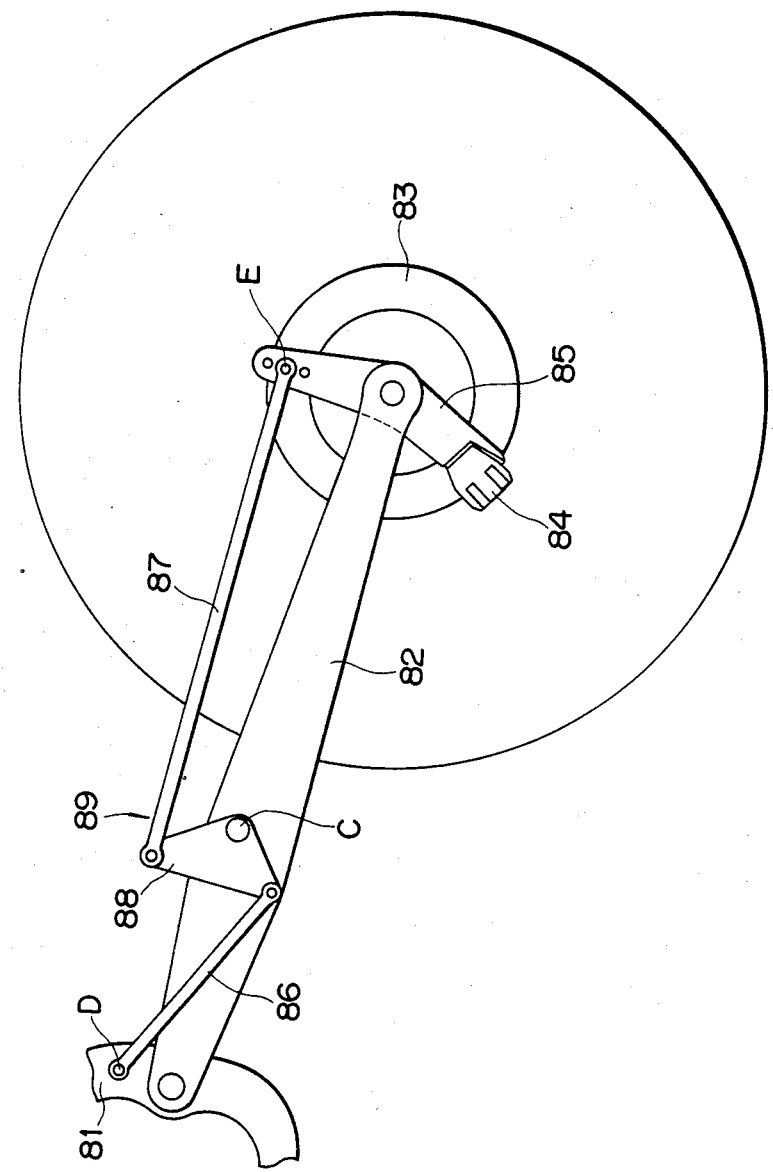

In the embodiments shown in FIGS. 4 and 5, the body frames 21 and 31 are formed with a plurality of substantially vertically spaced connecting holes 21a... and 31a..., respectively, whereby the connecting position c is made substantially vertically changeable to thereby permit adjustment of the inclination angle of the first torque rods 26 and 36 with respect to the horizontal direction.

Figure 11:
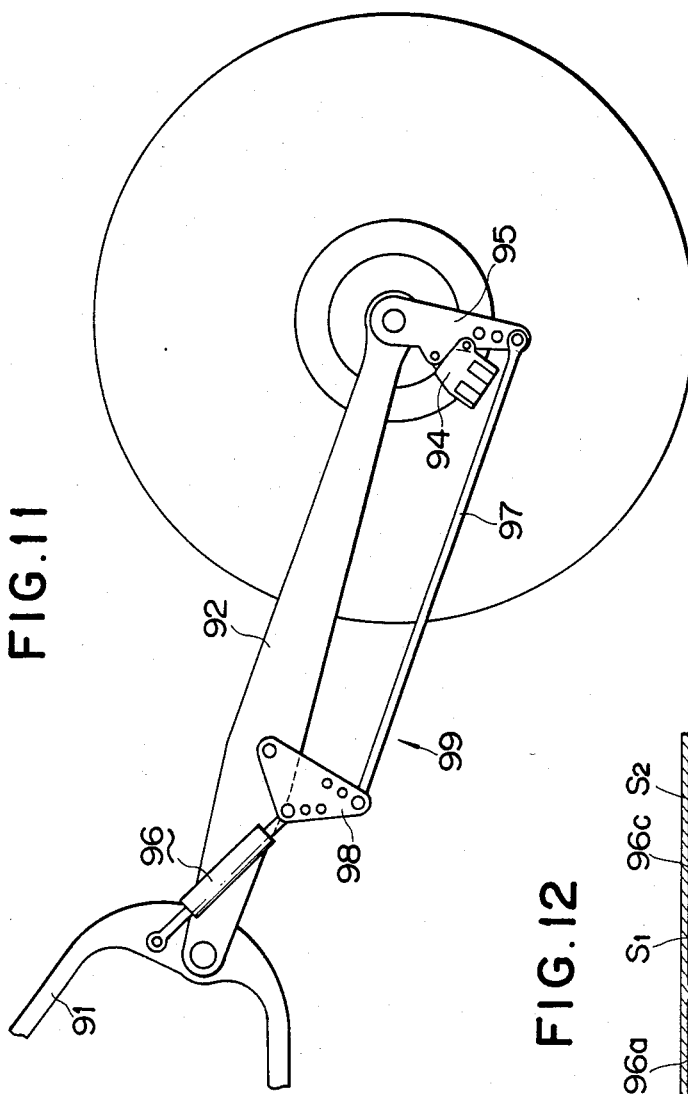
FIG. 11 is a side view of an anti-lifting mechanism according to a ninth modified embodiment of the invention wherein a torque transfer member has a cushioning property.
Figure 12:
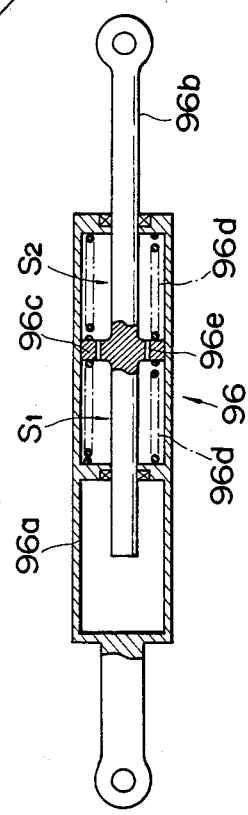
FIG. 12 is a sectional view of the torque transfer member having a cushioning property.

In the ninth embodiment shown in FIG. 11, a first torque rod 96 disposed on the side of a body frame 91 is endowed with a cushioning property, which rod 96 constitutes a torque transfer path 99 together with a link member 98 which is longitudinally pivotably connected to a rear fork 92 and a second torque rod 97 disposed on the side of braking means 94 and braking force sensing means 95. More particularly, as shown in FIG. 12, the first torque rod 96 comprises a cylinder 96a and a piston rod 96b slidably fitted therein, the rod 96b having a piston portion 96c whereby left and right chambers $S_1$ and $S_2$ are defined in the cylinder 96a, such chambers being filled with a cushioning oil. When the brake is not applied with no load imposed on the torque rod 96, the piston portion 96c is held in a neutral position by springs 96d, 96d mounted on both sides of the piston portion 96c. When the motor vehicle is braked, an axial load acts on the torque rod 96, but it is cushioned by the springs 96d and by an oil flow throttling action induced by orifices 96e, 96e formed in the piston portion 96c for the flow of the cushioning oil between the chambers $S_1$ and $S_2$, whereby there is attained a soft anti-lifting effect, and the torque transfer path 99 can be protected from a damage during sudden braking.

The structure for attaining such cushioning characteristic is not limited to that shown in FIG. 12. Any other suitable structure may be adopted for this purpose. Moreover, the second torque rod may be endowed with such cushioning property, if desired.

According to the first through ninth embodiments of the present invention, as will be apparent from the above description, the torque transfer path which interconnects the body frame and the braking force sensing means is constituted of a first torque transfer member on the body frame side, a second torque transfer member on the braking force sensing means side and a link member which is longitudinally pivotably connected to the rear wheel supporting member and which interconnects the torque transfer members. Consequently, unlike the case where the torque transfer path is formed by a single torque rod, it is not always necessary to cross the torque transfer path and the rear wheel supporting member when viewed from the side such that the connection between the body frame and the first torque transfer member and that between the braking force sensing means and the second torque transfer member are vertically opposite to each other with respect to the rear wheel supporting member. As a result, there is obtained a design freedom concerning the layout of the torque transfer path and the mounting position of the torque transfer members, and it becomes possible to effect mounting of the torque transfer path constituting members by utilization of a space where the devices required for the motor vehicle are not disposed. Furthermore, although the torque transfer path is formed as a bent path to avoid interference with the rear wheel supporting member and rear wheel, it is possible to make the first and second torque transfer members short and straight, thus permitting improvement in strength of such torque transfer members, which is highly effective in the transfer of torque between the body frame and the braking force sensing means.

Figure 13:
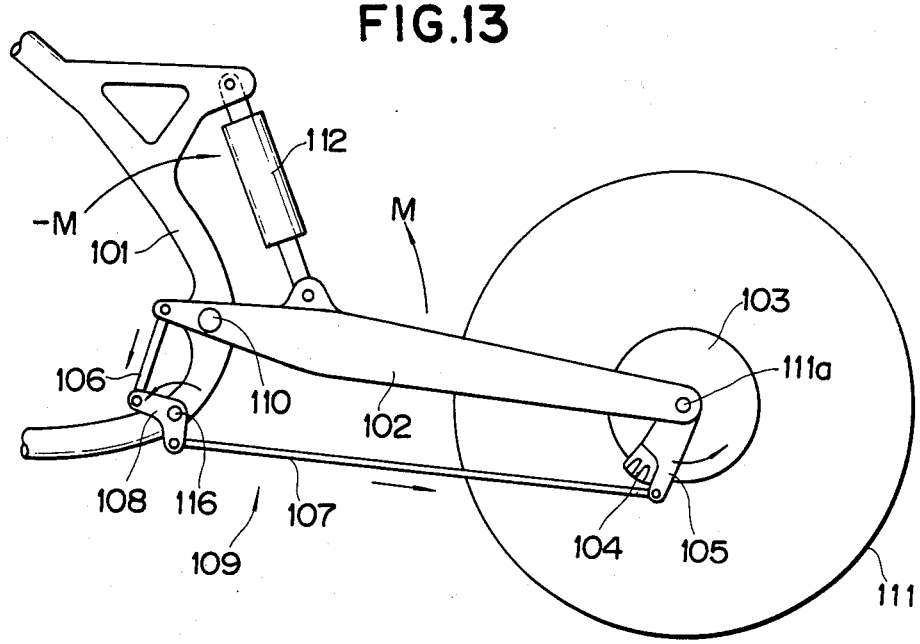
FIG. 13 is a side view of an anti-lifting mechanism according to a tenth embodiment of the invention wherein a link member is pivotally connected to a vehicular body frame.

Referring now to FIG. 13, there is shown a tenth embodiment of the present invention with a link member pivotally connected to the body frame side, in which a body frame 101, a rear fork 102 and a brake disc 103 perform the same functions as in the embodiments shown in FIGS. 1 through 12.

On the other hand, a crank member 108 serving as a link member being substantially L-shaped in a side elevational view, is pivotably connected to the body frame 101 in a position below a pivot shaft 110 through a pin 116 which is fitted in an intermediate position of the crank member 108. The crank member 108 is connected at one end thereof to the front end of the rear fork 102 through a first torque rod 106 and at the other end thereof to the lower end of a caliper bracket 105 through a second torque rod 107, the caliper bracket 105 serving as a braking force sensing means.

When a brake caliper 104 is operated to bring the brake pad thereof into pressure contact with the brake disc 103 during travel of the motor vehicle, the brake caliper 104 and the caliper bracket 105 which holds the brake caliper both move pivotally in the rotating direction of a rear wheel 111, namely, in a counterclockwise direction in FIG. 13, about an axle 111a by virtue of a frictional force produced between the contact surfaces of the brake pad and the brake disc, so that the second torque rod 107 connected at one end to the lower end of the caliper bracket 105 is pulled backward (to the right in FIG. 13), whereby the crank member 108 is pivotally moved in a counterclockwise direction in FIG. 13 about the pin 116, and consequently the front end of the rear fork 102 is pulled downward through the first torque rod 106.

As a result, a counterclockwise moment M centering around the pivot shaft 110 is generated on the rear fork 102, while on the body frame 101 is produced a resisting moment $-M$ of a magnitude equal to and in a direction opposite to the moment M, namely, in a clockwise direction in FIG. 13. Consequently, as in the foregoing first through ninth embodiments, the phenomenon of the vehicular front portion going down and the rear portion being lifted up at the time of application of the brake, that is, the foregoing tail lifting phenomenon, is effectively prevented from occurring by such resisting moment $-M$, thus permitting the vehicular body to maintain a stable posture even during braking.

Because in this embodiment the crank member 108 is attached to the body frame 101, the unsprung load of a shock absorber 112 is diminished as compared with the conventional device, and riding comfort is considerably improved.

Figure 14:
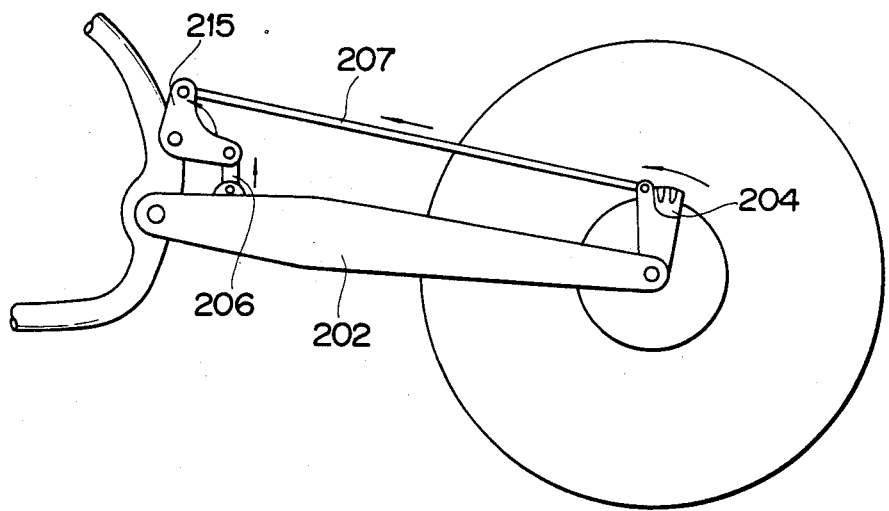
FIGS. 14 through 16 are side views of anti-lifting mechanisms according to eleventh through thirteenth embodiments of the invention, respectively.
Figure 15:
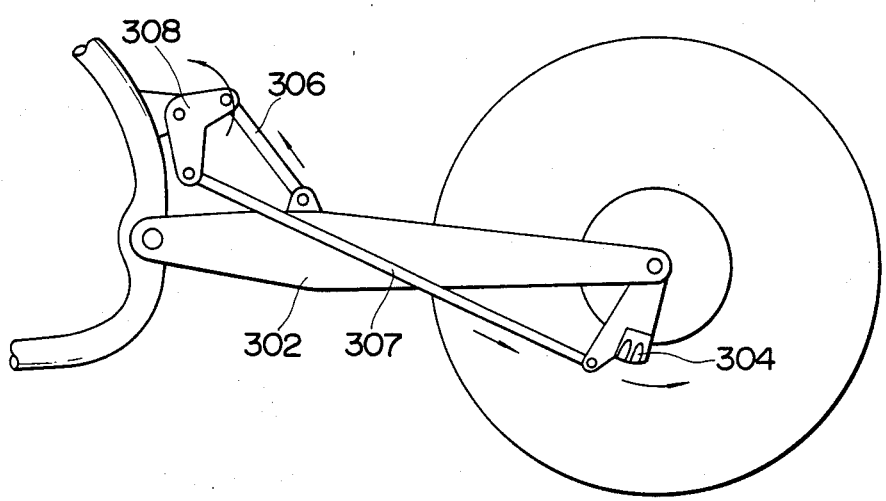
Figure 16:
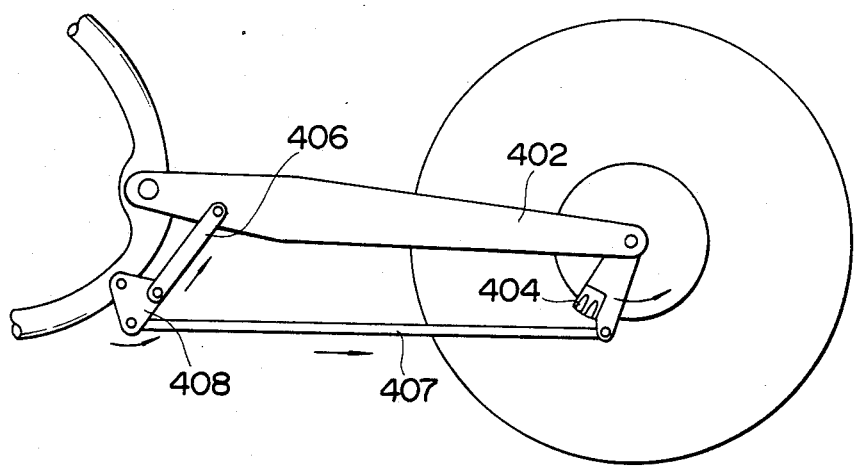

Referring now to FIGS. 14 through 16, there are shown further embodiments of the present invention wherein, as in the tenth embodiment described above, a crank member which serves as a link member is mounted on the body frame side.

FIG. 14 shows an example in which a crank member 215 and a brake caliper 204 are disposed above a rear fork 202, with second and first torque rods 207 and 206 functioning as a push rod and a tension rod, respectively.

FIG. 15 shows an example in which a crank member 308 and a brake caliper 304 are disposed above and below a rear fork 302, respectively, with first and second torque rods 306 and 307 both functioning as a tension rod.

Further, FIG. 16 shows an example in which, as in FIG. 13, both a crank member 408 and a brake caliper 404 are disposed below a rear fork 402, however, unlike FIG. 13, a torque rod 406 is used as a push rod.

In the modified embodiments shown in FIGS. 14 through 16 there can be obtained the same effect as that obtained in the foregoing tenth embodiment (shown in FIG. 13).

As is apparent from the various embodiments described hereinbefore, a desired torque rod arrangement can be freely selected by changing the layout of a crank member and brake caliper, and the torque rods are each employable as a push rod or a tension rod, thus facilitating the system construction.

It should be readily clear from the foregoing description that according to the tenth through thirteenth embodiments, because the crank member is attached to the body frame, not only an improvement of comfort is attained by reducing the unsprung load of the damper, but also the freedom of layout of the torque rods becomes larger, thereby facilitating the system construction.

Moreover, although in FIGS. 13–16 there is provided only one pivot point for an end portion of each torque rod, there may alternatively be formed a plurality of connecting holes, for example in the caliper bracket, to permit changing of the mounting position of the torque rod as in the first through ninth embodiments.

What is claimed is:

1. An anti-lifting mechanism in a motor vehicle having at least one shock absorber, a rear wheel supporting member vertically and pivotably connected at the front end thereof to a body frame of the vehicle, a brake member integrally connected with a rear wheel and rotatably supported by said rear wheel supporting member, braking means for braking at least one rear wheel by pressure contact thereof with said brake member, braking force sensing means fixed to said braking means and rotatably supported by a rear axle which supports said rear wheel, and torque link means disposed between said braking force sensing means and said body frame for transmitting a braking torque of said rear wheel to the vehicle body, wherein:

said torque link means comprises:

a substantially straight first torque transfer member;

a substantially straight second torque transfer member;

a link member interposed between said first and said second torque transfer members so as to interconnect said torque transfer members, whereby said body frame is prevented from being lifted up at the rear portion thereof during braking;

said first torque transfer member being pivotally connected at one end thereof to either one of said body frame and said rear wheel supporting member;

said second torque transfer member being pivotally connected at one end thereof to said braking force sensing means; and said link member having a first end pivotally connected to the other one of said body frame and said rear wheel supporting member, a second end pivotally connected to the other end of said first torque transfer member and a third end pivotally connected to the other end of said second torque transfer member.

2. An anti-lifting mechanism according to claim 1, wherein said first end of said link member is pivotally connected to said rear wheel supporting member.

3. An anti-lifting mechanism according to claim 2, wherein said second and third ends of said link member are disposed vertically on the same side with respect to said first end of said link member, and the pivot point between said body frame and said first torque transfer member and the pivot point between said braking force sensing means and said second torque transfer member are disposed vertically opposite to each other with respect to said rear wheel supporting member.

4. An anti-lifting mechanism according to claim 3, wherein said second and third ends of said link member are disposed below said first end of said link member, the pivot point between said body frame and said first torque transfer member is disposed above said rear wheel supporting member, and the pivot point between said braking force sensing means and said second torque transfer member is disposed below said rear wheel supporting member.

5. An anti-lifting mechanism according to claim 3, wherein said second and third ends of said link member are disposed above said first end of said link member, the pivot point between said body frame and said first torque transfer member is disposed above said rear wheel supporting member, and the pivot point between said braking force sensing means and said second torque transfer member is disposed below said rear wheel supporting member.

6. An anti-lifting mechanism according to claim 3, wherein said second and third ends of said link member are disposed below said first end of said link member, the pivot point between said body frame and said first torque transfer member is disposed below said rear wheel supporting member, and the pivot point between said braking force sensing means and said second torque transfer member is disposed above said rear wheel supporting member.

7. An anti-lifting mechanism according to claim 3, wherein said second and third ends of said link member are disposed above said first end of said link member, the pivot point between said body frame and said first torque transfer member is disposed below said rear wheel supporting member, and the pivot point between said braking force sensing means and said second torque transfer member is disposed above said rear wheel supporting member.

8. An anti-lifting mechanism according to claim 2, wherein said second and third ends of said link member are disposed vertically opposite to each other with respect to said first end of said link member, and the pivot point between said body frame and said first torque transfer member and the pivot point between said braking force sensing means and said second torque transfer member are disposed vertically on the same side with respect to said rear wheel supporting member.

9. An anti-lifting mechanism according to claim 8, wherein said second end of said link member is disposed above said first end of said link member, said third end of said link member is disposed below said first end of said link member, and the pivot point between said body frame and said first torque transfer member and the pivot point between said braking force sensing means and said second torque transfer member are disposed below said rear wheel supporting member.

10. An anti-lifting mechanism according to claim 8, wherein said second end of said link member is disposed below said first end of said link member, said third end of said link member is disposed above said first end of said link member, and the pivot point between said body frame and said first torque transfer member and the pivot point between said braking force sensing means and said second torque transfer member are disposed below said rear wheel supporting member.

11. An anti-lifting mechanism according to claim 8, wherein said second end of said link member is disposed above said first end of said link member, said third end of said link member is disposed below said first end of said link member, and the pivot point between said body frame and said first torque transfer member and the pivot point between said braking force sensing means and said second torque transfer member are disposed above said rear wheel supporting member.

12. An anti-lifting mechanism according to claim 8, wherein said second end of said link member is disposed below said first end of said link member, said third end of said link member is disposed above said first end of said link member, and the pivot point between said body frame and said first torque transfer member and the pivot point between said braking force sensing means and said second torque transfer member are disposed above said rear wheel supporting member.

13. An anti-lifting mechanism according to claim 1, wherein said first end of said link member is pivotally connected to said body frame.

14. An anti-lifting mechanism according to claim 13, wherein said first end of said link member is disposed in a position either above or below the pivot point between said rear wheel supporting member and said body frame.

15. An anti-lifting mechanism according to claim 14, wherein said one end of said second torque transfer member is pivotally connected to said braking force sensing means in a position below said rear wheel supporting member, thus allowing said second torque transfer member to act as a tension rod against said link member during braking, and said other end of said first torque transfer member is pivotally connected to said rear wheel supporting member in a position either before or behind the pivot point between said rear wheel supporting member and said body frame so as to move the rear portion of said rear wheel supporting member upward during braking.

16. An anti-lifting mechanism according to claim 15, wherein said first end of said link member is disposed below the pivot point between said rear wheel supporting member and said body frame, and said other end of said first torque transfer member is pivotally connected to said rear wheel supporting member in a position forwardly of the pivot point between said rear wheel supporting member and said body frame.

17. An anti-lifting mechanism according to claim 15, wherein said first end of said link member is disposed below the pivot point between said rear wheel supporting member and said body frame, and said other end of said first torque transfer member is pivotally connected to said rear wheel supporting member in a position behind the pivot point between said rear wheel supporting member and said body frame.

18. An anti-lifting mechanism according to claim 15, wherein said first end of said link member is disposed above the pivot point between said rear wheel supporting member and said body frame, and said other end of said first torque transfer member is pivotally connected to said rear wheel supporting member in a position forwardly of the pivot point between said rear wheel supporting member and said body frame.

19. An anti-lifting mechanism according to claim 15, wherein said first end of said link member is disposed above the pivot point between said rear wheel supporting member and said body frame, and said other end of said first torque transfer member is pivotally connected to said rear wheel supporting member in a position behind the pivot point between said rear wheel supporting member and said body frame.

20. An anti-lifting mechanism according to claim 14, wherein said one end of said second torque transfer member is pivotally connected to said braking force sensing means in a position above said rear wheel supporting member, thus allowing said second torque transfer member to act as a push rod against said link member during braking, and said other end of said first torque transfer member is pivotally connected to said rear wheel supporting member in a position either before or behind the pivot point between said rear wheel supporting member and said body frame so as to move the rear portion of said rear wheel supporting member upward during braking.

21. An anti-lifting mechanism according to claim 20, wherein said first end of said link member is disposed below the pivot point between said rear wheel supporting member and said body frame, and said other end of said first torque transfer member is pivotally connected to said rear wheel supporting member in a position forwardly of the pivot point between said rear wheel supporting member and said body frame.

22. An anti-lifting mehanism according to claim 20, wherein said first end of said link member is disposed below the pivot point between said rear wheel supporting member and said body frame, and said other end of said first torque transfer member is pivotally connected to said rear wheel supporting member in a position behind the pivot point between said rear wheel supporting member and said body frame.

23. An anti-lifting mechanism according to claim 20, wherein said first end of said link member is disposed above the pivot point between said rear wheel supporting member and said body frame, and said other end of said first torque transfer member is pivotally connected to said rear wheel supporting member in a position forwardly of the pivot point between said rear wheel supporting member and said body frame.

24. An anti-lifting mechanism according to claim 20, wherein said first end of said link member is disposed above the pivot point between said rear wheel supporting member and said body frame, and said other end of said first torque transfer member is pivotally connected to said rear wheel supporting member in a position behind the pivot point between said rear wheel supporting member and said body frame.

25. An anti-lifting mechanism according to claim 1, wherein at least one of the four pivot points at both ends of said first torque transfer member and of said second torque transfer member is capable of being adjusted in the mounting position thereof.

26. An anti-lifting mechanism according to claim 1, wherein at least one of said first and second torque transfer members has a cushioning characteristic.

27. An anti-lifting mechanism according to claim 1, wherein each of said first and second torque transfer members is a rod.

28. An anti-lifting mechanism according to claim 1, wherein said link member is a bell crank.

29. An anti-lifting mechanism according to claim 1, wherein said brake member and said braking means are a disc and a brake caliper, respectively.

30. An anti-lifting mechanism according to claim 1, wherein at least one of said first and second torque transfer members is capable of being adjusted its length.

* * * * *